(12) United States Patent
Bedingfield, Sr. et al.

(10) Patent No.: US 7,394,897 B1
(45) Date of Patent: Jul. 1, 2008

(54) METHOD AND SYSTEM FOR ROUTING SERVICE CALLS MADE FROM RESOLD LINES

(75) Inventors: James C. Bedingfield, Sr., Lilburn, GA (US); Scott C. Holt, Atlanta, GA (US); Stephen R. LaPierre, Union City, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 09/530,723

(22) PCT Filed: Nov. 4, 1998

(86) PCT No.: PCT/US98/23443

§ 371 (c)(1),
(2), (4) Date: May 2, 2000

(87) PCT Pub. No.: WO99/23808

PCT Pub. Date: May 14, 1999

(51) Int. Cl.
*H04M 7/00* (2006.01)

(52) U.S. Cl. .............................. 379/220.02; 379/221.01; 379/220.01; 379/127.01

(58) Field of Classification Search ................. 379/120, 379/220.01, 221.01, 221.12, 221.08
See application file for complete search history.

(56) References Cited

U.S. PATENT DOCUMENTS

| | | | | |
|---|---|---|---|---|
| 5,259,026 A | * | 11/1993 | Johnson .................. | 379/216.01 |
| 5,430,719 A | | 7/1995 | Weisser, Jr. | |
| 5,475,749 A | | 12/1995 | Akinpelu et al. | |
| 5,550,912 A | | 8/1996 | Akinpelu et al. | |
| 5,764,745 A | * | 6/1998 | Chan et al. .............. | 379/221.13 |
| 5,796,813 A | | 8/1998 | Sonnenberg | |
| 5,862,334 A | * | 1/1999 | Schwartz et al. ............ | 709/223 |
| 5,903,639 A | * | 5/1999 | Lipchock et al. ........ | 379/221.08 |
| 5,917,899 A | * | 6/1999 | Moss et al. ............ | 379/221.08 |
| 5,940,378 A | * | 8/1999 | Ushiki et al. ................ | 370/259 |
| 5,963,630 A | * | 10/1999 | Dabbs et al. ........... | 379/201.01 |
| 6,038,227 A | * | 3/2000 | Farris et al. .................. | 370/354 |
| 6,173,051 B1 | * | 1/2001 | Lipchock et al. ....... | 379/220.01 |

(Continued)

*Primary Examiner*—Ahmad F. Matar
*Assistant Examiner*—Karen Le
(74) *Attorney, Agent, or Firm*—Merchant & Gould (57) ABSTRACT

A method and system for routing service calls made from lines resold to a competitive service provider includes advanced intelligent network and standard switching functionality. The call may be made into an AIN service switching point (60) or a non-AIN switch (62-64). All calls are routed to an AIN hub (190), such as a service switching point, via a trunk group. The AIN or non-AIN switch may access a line class code table (160-164) to determine the proper routing information. Calls made from resold lines are routed to the AIN hub (190). Once the call is routed to the AIN hub, a trigger (187) provisioned on the AIN hub and assigned to the incoming trunk group causes the hub to suspend the call and launch a query to a service control point (200). The query includes the directory number of the resold calling line and the originally dialed number. The SCP (670) accesses a database (675) containing directory numbers for resold lines and identifiers for competitive service providers. Once the carrier is located, additional tables may be accessed to determine the routing information specified by the carrier for handling the call. The routing information is transmitted by the SCP (670) back to the SSP (610). The SSP (610) then routes the call to the specified location.

18 Claims, 7 Drawing Sheets

U.S. PATENT DOCUMENTS

| | | | |
|---|---|---|---|
| 6,205,214 B1 * | 3/2001 | Culli et al. | 379/220.01 |
| 6,341,162 B1 * | 1/2002 | Kelly et al. | 379/221.09 |
| 6,442,267 B2 * | 8/2002 | Culli et al. | 379/220.01 |
| 6,445,782 B1 * | 9/2002 | Elfe et al. | 379/201.01 |
| 2001/0001012 A1 * | 5/2001 | Culli et al. | 379/112 |

* cited by examiner

FIGURE 1

| LCC | OPERATOR-ASSISTED | 611 | 411 | ROUTING INFORMATION |
|---|---|---|---|---|
| 10 | YES | YES | YES | 9047 |
| 12 | YES | NO | YES | 9034 |
| 13 | NO | YES | YES | 9014 |
| 14 | NO | NO | YES | 9074 |
| 110 | YES | YES | YES | 8046 |
| 112 | YES | NO | YES | 8034 |
| 113 | NO | YES | YES | 8046 |
| 114 | NO | YES | YES | 8028 |
| 210 | YES | YES | YES | 6014 |
| 212 | NO | NO | YES | 6074 |
| 213 | NO | YES | YES | 6046 |
| 214 | NO | YES | YES | 6087 |

| DIRECTORY # | LOCAL EXCHANGE CARRER |
|---|---|
| 213-444-1111 | 608 |
| 213-444-2222 | 604 |
| 213-444-3333 | 605 |

| LOCAL EXCHANGE CARRER | CALL TYPE #1 | CALL TYPE #2 | CALL TYPE #3 |
|---|---|---|---|
| 603 | RI197 | 770-473-8903 | 60193 |
| 604 | 404-983-0928 | 10493 | 63847 |
| 605 | RI308 | RI314 | 770-673-5498 |

| DIRECTORY # | LOCAL EXCHANGE CARRER |
|---|---|
| 770-555-1234 | 604 |
| 770-444-1234 | 605 |
| 770-333-1234 | 606 |

| LOCAL EXCHANGE CARRER | 411 Calls | Operator Calls | 611 Calls |
|---|---|---|---|
| 604 | RI209 | RI183 | rI215 |
| 605 | RI109 | RI109 | RI234 |
| 606 | RI308 | RI314 | RI346 |

METHOD AND SYSTEM FOR ROUTING SERVICE CALLS MADE FROM RESOLD LINES

BACKGROUND OF THE INVENTION

1. Field of the Invention

The present invention is directed to a method and system for routing telephone service calls, including directory information, operator-assistance, and service repair calls made from resold lines. More particularly, this invention is directed to a method and system that routes service calls from resold lines using hybrid advanced intelligent network and switching functionality.

2. Background

The current telecommunications market includes a group of incumbent local exchange carriers ("ILECs") that own switching infrastructures and possess intelligent network capabilities. Each ILEC provides local telephone service for a particular geographic region of the country. This group of ILECs has existed for many years, and only recently have smaller carriers attempted to enter the market to establish a foothold. To enter the market, a carrier would be required to create its own switching infrastructure and intelligent network capabilities. Such a project would require the carrier to construct new telephone lines and cables, route those lines to each desired home, and create the necessary switching functionality. Clearly, this effort would cost millions, perhaps billions, of dollars for each emerging carrier.

Pursuant to the Telecommunications Act of 1996, the FCC has mandated certain "interconnection" requirements to make it easier for new carriers to enter a local telecommunications market. In FCC Report & Order in the matter of Local Competition, docket 96-98 released Aug. 8, 1996, the FCC required ILECs to "unbundle" certain elements of their existing telecommunications network. "Unbundling" is a regulatory requirement providing competitive local exchange carriers ("CLECs") or other service providers the ability to separately lease discrete functional components of an ILEC's network to provide service. An unbundled local loop, for example, is an ILEC-provided transmission path between, and including, the customer network interface (e.g., the jack) located at the end-customer's premises and the central office loop termination located in the ILEC's central office building. As another example, an unbundled port provides a service provider with local switching functionality, separate from the local loop, on an ILEC's switch as an alternative to providing a stand-alone switch. Numerous components may be unbundled, including the local loop, switch ports, and Advanced Intelligent Network ("AIN") triggers. If the loop and the port are rented to a service provider, however, the entire line is considered "resold."

In a resale environment, end customers on resold lines may still obtain certain services, such as operator-assisted service, directory information service ("411" and LNPA-555-1212, where "LNPA" is the Local Numbering Plan Area (i.e., the area code)), repair service ("611"), LNPA-555-1212 calls, and 976/900 number blocking, for example. Although the line has been resold, the customer remains connected to the ILEC's switch. Thus, when a resold customer dials 411 or 611, she will be connected to the ILEC's directory assistance operator or repair service operator, respectively. The customer will receive a bill from the service provider that owns the resold line. This scenario is often undesirable for the service provider. The service provider would prefer the option of having such calls be routed to its own operators who can provide a specific type of service.

To allow service providers to select their own locations for handling service calls, certain ILECs have incorporated methods within their network to identify individual lines as being resold. The use of line class codes is one such method for identifying resold lines. A line class code is a code within the ILEC's end office switch that is used to index a routing profile for a particular class of service. Each class of service, including various configurations of residential and business services, is assigned a line class code. The switch uses the line class code to determine the proper routing for the call. Each time a new service provider is introduced, a new set of line class codes corresponding to the existing line class codes may be assigned. This solution is not entirely feasible because a new line class code must be assigned potentially for every class of service and for every carrier. Moreover, the line class codes must be replicated in every switch. While ILECs have taken measures to prevent running out of line class codes, these codes are still considered limited resources.

Alternatively, ELECs may add new software directly to the switch to determine the proper routing for service calls made on resold lines. This would require modifying each switch in the ILEC's network. Switch vendors, however, have indicated that the capability to implement such modifications is years away and would be prohibitively expensive. In addition, making routing modifications in every switch would be very time-consuming.

The use of a pure advanced intelligent network ("AIN") method is a third option for ILECs. In an AIN environment, network nodes work autonomously and make decisions on routing and call handling without human intervention. Databases are often used to store information on how certain calls should be routed, or how calls should be handled. AIN triggers are also used to instruct various nodes on where to route calls and/or how to handle such calls. Unfortunately, the pure AIN solution has drawbacks. First, all of the ILEC's switches may not be AINN-compatible, thus making a complete AIN solution impossible. Second, all calls do not automatically cause an AIN trigger to fire. Thus, certain nodes would not detect certain calls as having been made from a resold line. As a result, such call would not be properly routed to the service provider's desired location.

SUMMARY OF THE INVENTION

The present invention overcomes the problems of the prior art by providing a hybrid AIN/switching solution. More particularly, the method and system of this invention allows service providers to route service calls to predetermined service locations from lines that are coupled to AIN or non-AIN switches. All calls are routed to a central AIN hub, such as a service switching point. The AIN hub transmits a query to a service control point that accesses a database to provide routing instructions for the hub. The AIN hub then routes the call to the predetermined service location.

Service calls may be made from resold lines terminating at AIN or non-AIN switches. The switch uses line class code tables to determine the proper routing for the service call. Rather than use multiple sets of line class codes for each service provider, however, this invention uses a single set of line class codes for all resold lines. The line class codes for resold lines reference the AIN hub. Unlike previous methods, valuable storage space and memory within the switch are not consumed by the addition of resold lines. Instead, resold lines are all assigned the single set of line class codes that reference a trunk group to the AIN hub. Thus, this invention is a more efficient alternative for service providers.

The AIN hub may be an AIN-capable switch, such as a service switching point. The hub is provisioned with a call origination AIN trigger, such as, for example, an off-hook delayed trigger. The trigger is assigned to the incoming trunk groups from the end office switches. The call origination trigger assigned to the trunk groups causes the hub to suspend each incoming call and query a service control point for routing instructions. The use of a centralized AIN hub also removes the burden of routing calls from the end office switches. Since all calls are ultimately routed to the hub, these end offices simply perform the line class code search and route all calls from resold lines to the hub.

The AIN hub transmits a query to a service control point. The query includes the directory number of the resold line and the dialed number. The service control point receives the query and accesses one or more databases to determine the routing information for handling the call as specified by the service provider. The database includes at least two tables. The first table matches the directory number of the resold line to the service provider that owns the line. The service provider may be identified by name or number. Once the service provider is identified, the service control point searches additional tables to determine the routing information. These tables may include routing information for each type of service call for each carrier and, possibly, based on the caller's location. Once the routing information is obtained, the service control point sends the routing information back to the AIN hub.

The AIN hub receives the routing information from the service control point and routes the service call as specified. The carrier may then handle the call in the appropriate manner.

As additional service providers are added, the system may be easily configured or reconfigured. Once the line is identified as a resold line, the set of line class codes for resold lines will cause the switch to route all service calls from the resold line to the AIN hub. The service provider can specify various locations for handling different types of service calls. These locations are stored in the service control point which will return the proper routing information to the AIN hub. The AIN hub will then route the service call to the specified location. Unlike the prior art scenario, each switch does have to be reconfigured.

Generally described, this invention is a system for routing a service call made from a resold calling line. The system includes a switch coupled to the line, the switch being operative to route the service call to a trunk group; a service switching point coupled to the trunk group, the switch having a trigger provisioned thereon to cause the switch to launch a query to a service control point upon receiving the call from the trunk group; and a service control point operative to receive the query from the service switching point and to provide routing instructions to the service switching point based upon routing information stored in at least one database coupled to the service control point, the routing information specifying instructions for handling the service call.

In another embodiment of this invention, a method for routing a service call made from a resold calling line includes the steps of: routing the service call to a switch; routing the service call from the switch to a trunk group; routing the service call from the trunk group to a service switching point; transmitting a query from the service switching point to the service control point to determine a location for handling the service call, the query including a directory number of the calling line and a called number; accessing a database containing an identifier for the service provider and instructions for handling the service call; transmitting the instructions to the service switching point; and routing the call from the service switching point to the location for handling the service call.

Accordingly, it is an object of this invention to provide a system for routing service calls made from lines resold to competitive service providers.

It is a further object of this invention to provide a system for routing service calls made from resold lines coupled to advanced intelligent network switches.

It is yet another object of this invention to provide a system for routing service calls made from resold lines coupled to non-advanced intelligent network switches.

It is an additional object of this invention to provide a system for routing service calls that eliminates the need for multiple line class codes for each carrier and each type of service.

It is a further object of this invention to provide a system for routing service calls that allows a service provider to specify the location for handling the service call.

It is an additional object of this invention to provide a system for routing service calls that allows a service provider to specify multiple locations for handling various types of service calls.

It is an additional object of this invention to provide a system for routing service calls that includes a central hub, thus making it easier to configure and reconfigure network elements when service providers and classes of service are added.

It is a further object of this invention to provide a system for routing service calls that incorporates AIN solutions to make call routing more flexible than non-AIN solutions.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1:
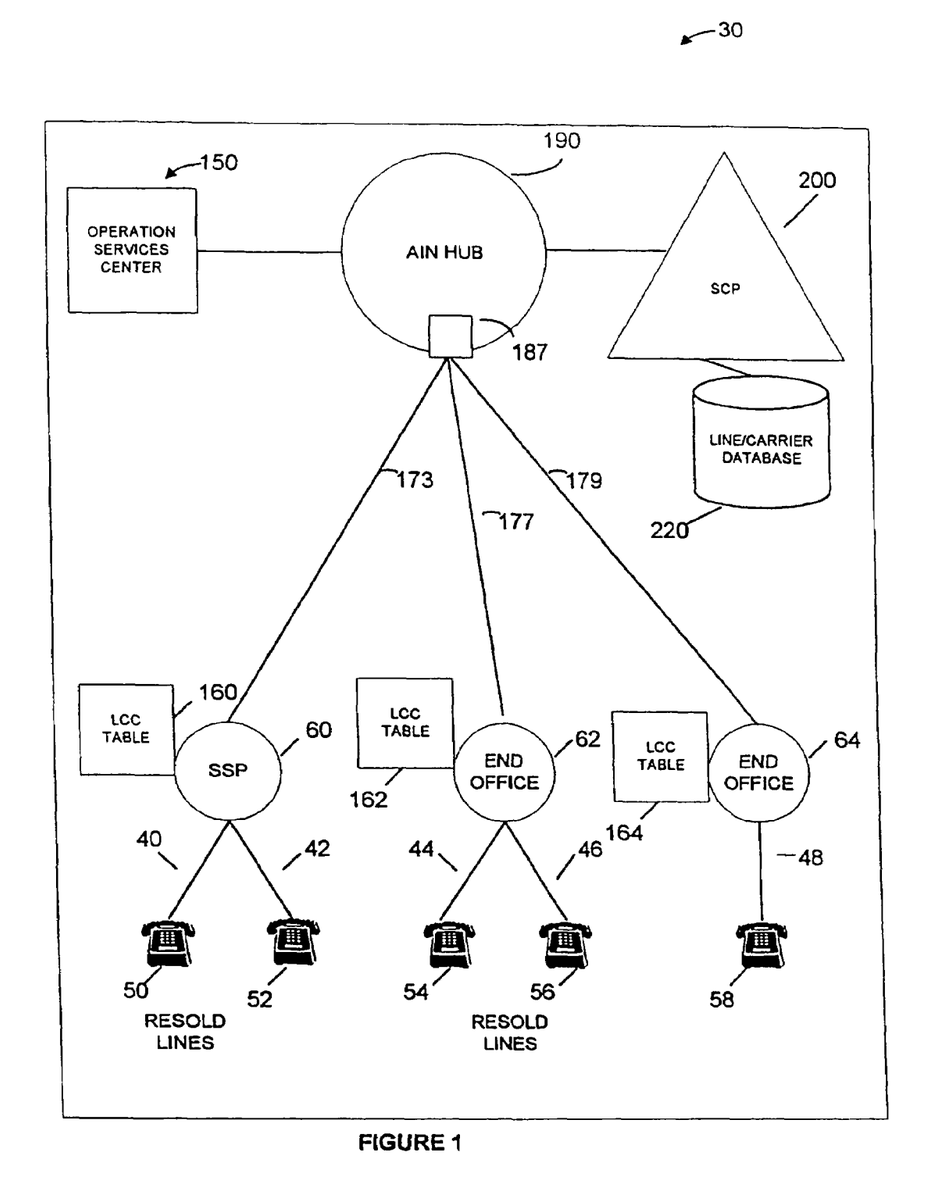
FIG. 1 is a block diagram of an ILEC telephone network 30, according to a preferred embodiment of the present invention.

FIG. 1 is a block diagram of an ILEC telephone network 30, according to a preferred embodiment of the present invention. The network 30 includes a plurality of telephone lines 40-48 coupling terminating equipment, such as, for example, a group of telephones 50-58 to one or more end offices 60-64. Although telephones are illustrated as the terminating equipment in FIG. 1, those skilled in the art will understand that such terminating equipment may include other telecommunication devices including, but not limited to, facsimile machines, computers, modems, etc. Certain of the telephone lines 40-46 are lines that have been resold by the ILEC to one or more competitive service providers. The resold lines 40-46 may be for home/personal use or for business/commercial use Each of the resold lines 40-42 may include one or more services offered by the service provider, including, but not limited to 411 directory assistance, 611 emergency repair, LNPA-555-1212, operator-assisted calls, and the blocking of 976 and/or 900 numbers. Each resold line allows a calling party (not shown) to dial a called party or a service number. In this exemplary embodiment the service provider has designated one or more operation services center 150 for accepting service calls from resold lines. It should be apparent that the service provider may designate multiple services centers for handling various types of service calls.

The resold lines extend from the called party's residence or business to end offices 60-64 operated by the ILEC. The end offices 60-64 connect subscribers in the network to each other and to other end offices via a trunk group. The end offices include serving switches that allow calls to be switched to and from other calling areas. End office 60 is an AIN-end office, such as a service switching point ("SSP"). An SSP typically includes switch functionality, but also includes other functionality so as to communicate with other AIN elements as those skilled in the art understand. End offices 62-64 are non-AIN end offices. The end offices in FIG. 1 are illustrated for exemplary purposes only. This invention may be used for resold lines coupled to either AIN end offices or non-AIN end offices. The network 30 may include additional elements, such as signal transfer points (not shown) that route calls between SSPs and other network elements. For further information regarding AIN technology and aspects thereof, the interested reader is referred to U.S. Pat. No. 5,430,719, to Weisser, which is incorporated herein by reference.

Figure 2:
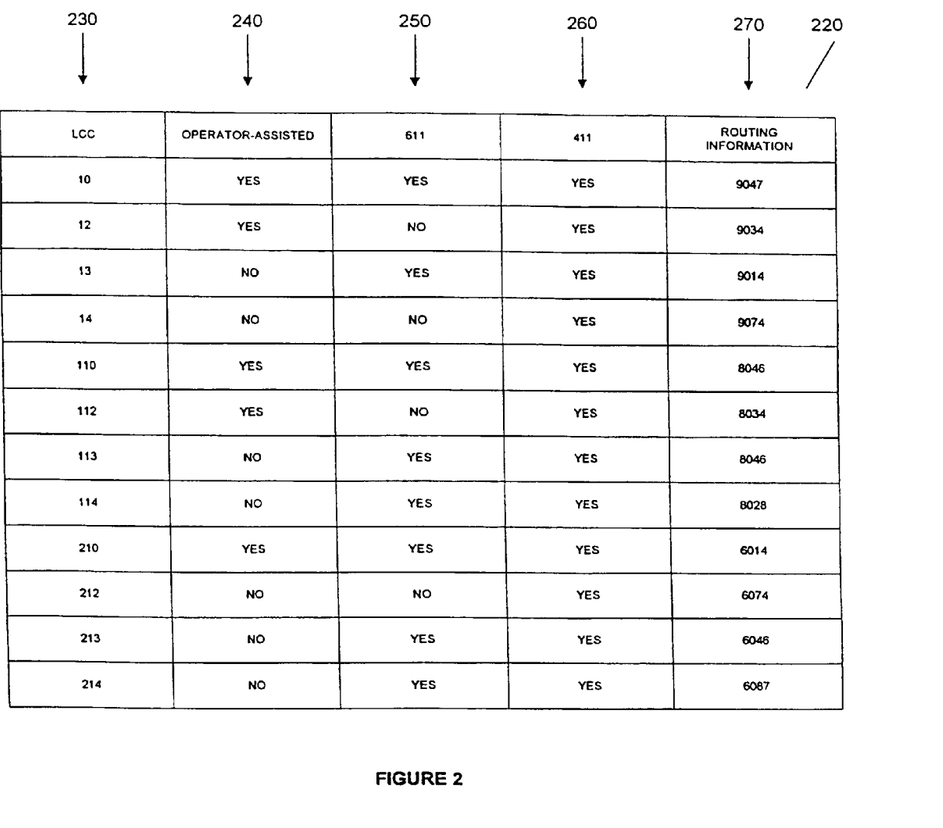
FIG. 2 is an example of a prior art line class code/screening index table as stored in a database.

End offices 60-64 include line class code ("LCC") tables 160-164, respectively, that contain line class codes and screening indices for various classes of services. FIG. 2 is an example of a prior art line class code table 220 as stored in an end office. Each line owned by the ILEC is assigned a particular line class code depending upon the service provider owning the line and the class of service available for that line. As shown, the table 220 includes a line class code column 230, and a plurality of service columns 240-260 for various types of service. In the exemplary table 220, line class codes 110, 112, 113, and 114 are codes for ILEC-owned lines. Line class codes 210, 212, 213, and 214 are assigned to lines owned by another service provider (e.g., "Service Provider 2"). Line class codes 310, 312, 313, and 314 are assigned to lines owned by a third service provider (e.g., "Service Provider 3"). The service columns specify whether the class of service for the particular line class code includes a particular service. The routing information column 270 then specifies the routing information for that class of service. For example, the table 220 indicates that the ILEC-owned lines having line class code 110 may make operator-assisted calls, 411 calls, and 611 calls. ILEC-owned lines having line class code 112 may only make operator-assisted service calls and 411 calls. Similarly, the lines owned by the other service providers having line class code 210 and 310 may make all three types of calls. As new service providers are added, the entire set of service classes must be replicated and a new set of line class codes must be assigned for the replicated service class. In the table 220, for example, lines having line class codes 10, 110, and 210 share the same type of service, yet each line has different line class codes.

Figure 3:
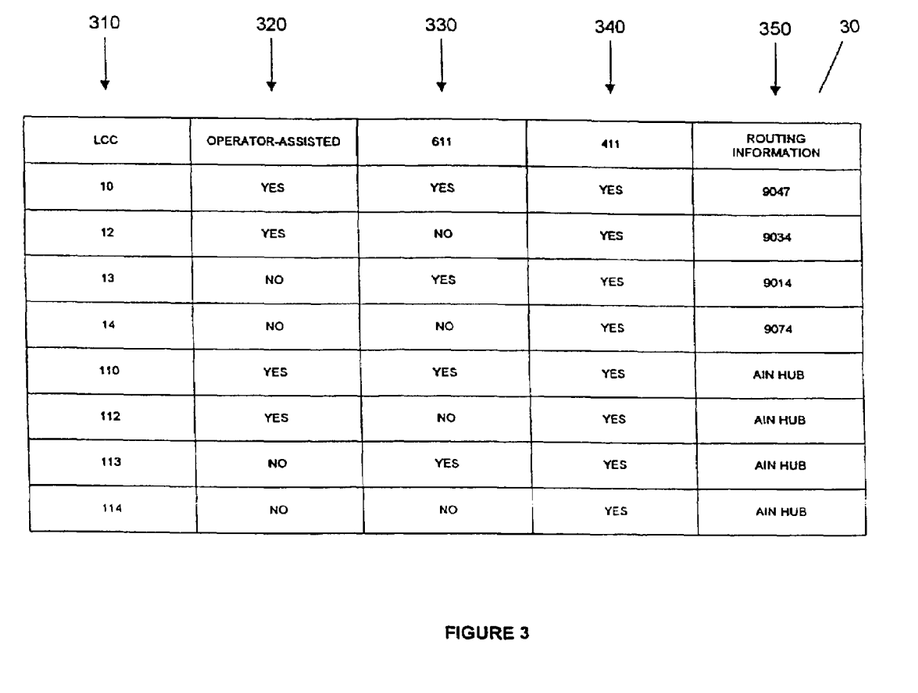
FIG. 3 is a line class code table, according to a preferred embodiment of the present invention.

FIG. 3 is a screening index table 300, according to this invention. All resold lines are assigned one new set of line class codes without regard to the service provider. The table 300 thus includes a line class code column 310 containing the class code for a line. Line class codes 110, 112, 113, and 114 are ILEC line class codes. Line class codes 210, 212, 213, and 214 are resold line class codes. Service columns 320-340 identify particular types of service that the line may or may not include. The routing information column 350 contains routing information for each line class code and class of service. In the present invention, the routing information for all resold line class codes specifies that the service call be routed to an AIN hub.

In this invention, all service calls made from resold lines are routed to an AIN hub 190 (FIG. 1). Calls may be routed using a routing index in the line class code table. The trunk groups terminate on ports in an AIN hub element 190. The AIN hub 190 is an AIN-capable end office, such as a service switching point. Any AIN-capable switch in the network may be designated the AIN hub 190. Although one AIN hub 190 is illustrated in FIG. 1, a network may contain numerous AIN hubs.

To notify the AIN hub 190 that AIN functions must be invoked (i.e., a query to a Service Control Point), the trunk groups 173, 177, 179 terminating at the AIN hub 190 are each assigned an off-hook delayed ("OHD") AIN trigger 187. Triggers are assigned on a per-trunk basis. The OHD trigger is normally associated with individual subscriber lines, rather than inter-switch trunk connections, as used in the present invention. When used with individual subscriber lines, the switch assigned to the line recognizes an OHD trigger upon receiving a valid number sequence following an off hook condition. The use of an OHD trigger in connection with inter-switch trunk connections, however, causes the AIN hub 190 to suspend all calls from that trunk group and launch a query to an SCP. Since the trunk group is designated specifically for routing service calls pursuant to this invention, the use of the OHD trigger in this manner is not cumbersome.

In response to the OH) trigger, the AIN hub 190 suspends the call and launches a query to an AIN Service Control Point ("AIN SCP") 200. As part of the query, the AIN hub 190 provides the AIN SCP 200 with the calling number of the calling party and the service number dialed by the calling party. The AIN SCP 200 is a computer server that accesses one or more databases and returns information to other network components based on service-specific programming. The SCP 200 receives call information in a query from the AIN hub 190 and translates query information (i.e., the calling number and dialed number) into routing instructions for the AIN hub 190. In this invention, AIN SCP 200 accesses a Line/Carrier database 220 containing information regarding the calling party's carrier and call type.

Figure 4:
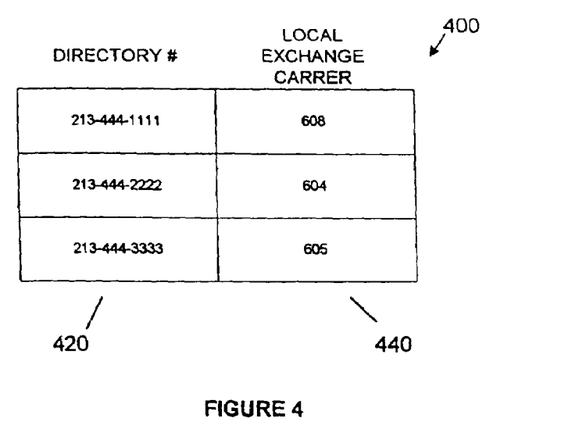
FIG. 4 is a block diagram of a Calling Party Number-to-Carrier Table stored in a Line/Carrier database.

The Line/Carrier database stores several accessible tables, including a Calling Party Number-to-Carrier Table 400. FIG. 4 is an illustration of an exemplary Calling Party Number-to-Carrier Table 400 stored in Line/Carrier database 220. The table 400 includes a Calling Party Directory Number column 420 containing a list of Calling Party numbers for resold lines, and a Local Exchange Carrier column 440 containing local exchange carrier identifiers corresponding to each calling party number. The local exchange carrier may be identified by name, number, or any other method for identifying a carrier. The AIN SCP 200 accesses the database 220 and searches the Calling Party Number-to-Carrier Table 400 for the calling party number provided by the AIN hub 190. Upon finding the calling party number in the Calling Party Number column 420, the AIN SCP 220 references the corresponding Local Exchange Carrier identifier in the Local Exchange Carrier column 440.

Figure 5:
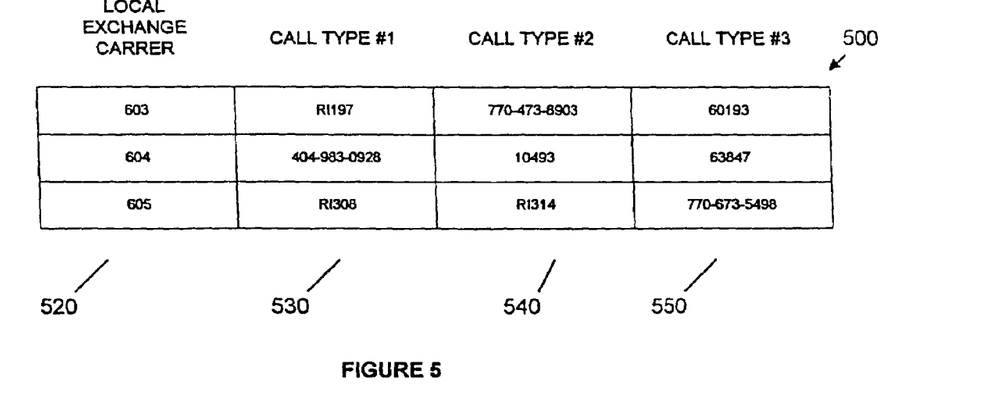
FIG. 5 is a block diagram of a Carrier Routing table as stored in the Line/Carrier database.

The AIN SCP 200 then uses the local exchange carrier identifier to access a Carrier Routing table 500 stored in the Line/Carrier database 220. FIG. 5 is a block diagram of an exemplary Carrier Routing table 500 as stored in the Line/Carrier database 220. The Carrier Routing table 500 includes a Local Exchange Carrier Identifier column 520, and a plurality of call type columns 530, 540, 550. The Local Exchange Carrier column 520 stores a plurality of identifiers for various local exchange carriers. The identifiers correspond to the identifiers found in the Local Exchange Carrier column 440 of the Calling Party Number-to-Carrier Table 400. Thus, the AIN SCP 200 uses the identifier obtained from the Calling Party Number-to-Carrier Table 400 to locate the carrier in the Carrier Routing table 500. Each local exchange carrier may desire that calls be routed to different locations within the network (or to other networks) depending upon the type of service call. Accordingly, once the AIN SCP 200 finds the appropriate local exchange carrier identifier, it also locates the appropriate Call Type column depending upon the call type. For instance, in FIG. 5, call type #1 may correspond to 411 calls, call type #2 may correspond to 611 calls, call type #3 may correspond to operator-assisted calls, etc. It should be apparent, however, that other service calls and non-service calls may be handled using a similar table. Once the correct carrier and call type have been located, the routing information may be obtained from that entry. The routing information may be any known type of routing information, including a routing index, a directory number, a carrier code or any combination of these. Other tabular information in the SCP may be used to make additional routing decisions based on, for example, the area in which the caller is located.

The AIN SCP 200 transmits the original calling number, the routing information, the dialed number, and the local exchange carrier identifier to the AIN hub 190. The routing index points to a set of trunks specified by the local exchange carrier in the Carrier Routing table. The AIN hub 190 transmits, as supported by the trunk type, the calling number, the dialed number, and the local exchange carrier identifier to the trunk group designated by the routing information. The call may then be handled by the service provider as it chooses.

Figure 6:
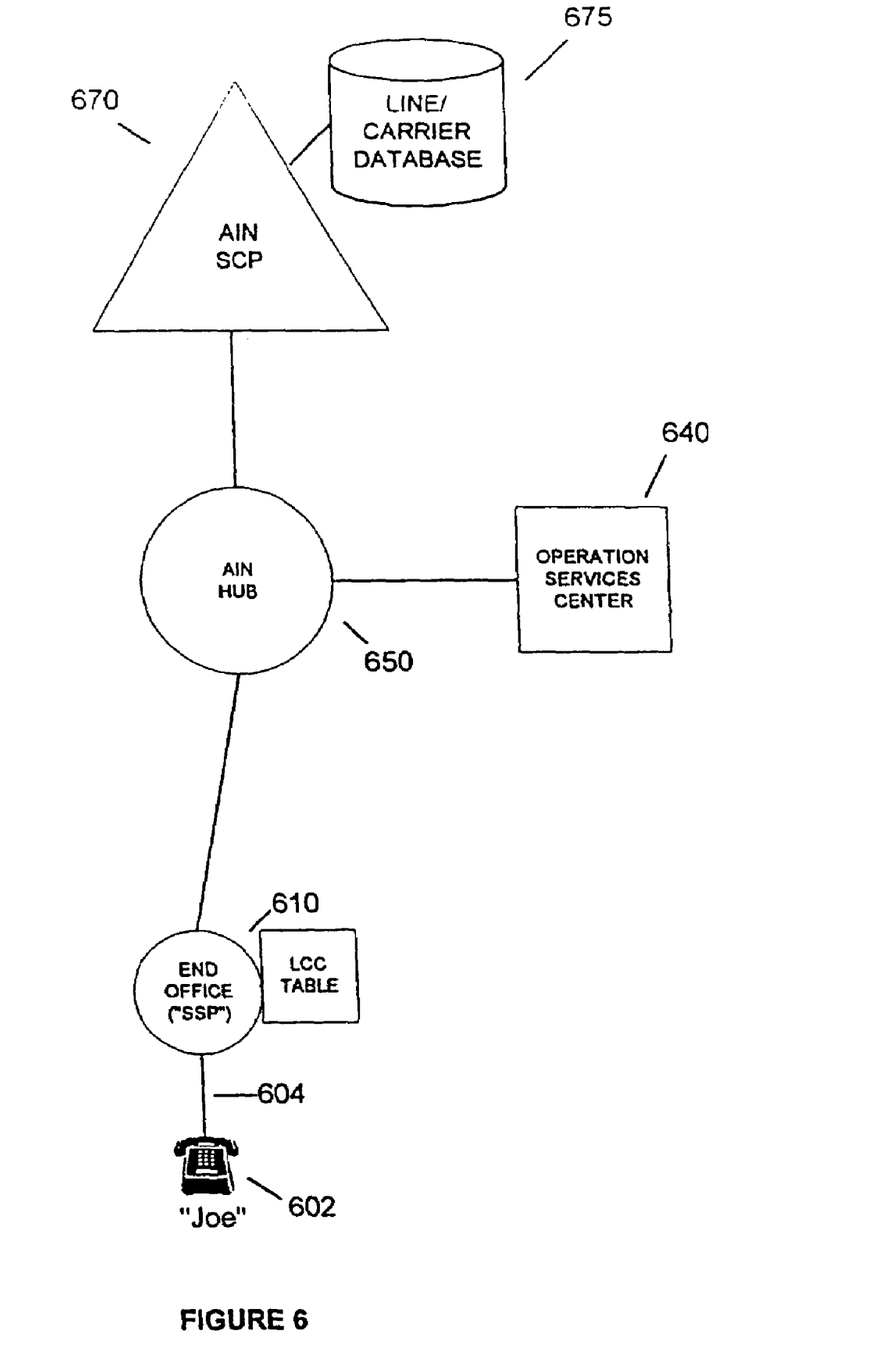
FIG. 6 is a block diagram of a network illustrating the method and system of this invention.

With continuing reference to FIGS. 1-5, and now turning to FIG. 6, the exemplary operation of this invention is described in the context of a subscriber to a competitive service provider placing a service call to "411" directory information. It will be appreciated by one skilled in the art that this invention is not limited to use of "411" calls, but may also include other service calls, including, but not limited to operator assistance calls, telephone repair calls, and collect calls.

In this example, a calling party ("Joe") having a calling party number (770-555-1234) uses his telephone 602, which is connected by calling line 604 to end office 610. In this example, end office 610 is an AIN-capable end office (i.e., an SSP). Joe places a call to "411" directory information. Joe subscribes to a competitive service provider ("CLEC 1"). CLEC 1, which is identified in the network by the identifier "604", has requested that all directory information calls be routed to a directory information service center 640 within the network. The service center 640 has a routing index number of "RI209". The ILEC, by arrangement, has stored the routing index for the information service center 640 within its AIN SCP databases.

As a result of Joe dialing "411", the SSP 610 accesses a line class code table 614. Within the table, the calling line is identified as a resold line of a particular class. The table 614 includes a routing index (or other routing identifier) for an AIN hub 650 within the network. The SSP 610 then routes the call to the AIN hub 650.

An OHD trigger assigned to the trunk group terminating at the AIN hub causes the AIN hub 650 to suspend the incoming call and query an SCP 670. The AIN hub 650 transmits a query to the SCP 670 containing the calling party number (770-555-1234) and the originally dialed number ("411"). The SCP 670 accesses a database 675 to determine where the call should be routed.

Figure 7:
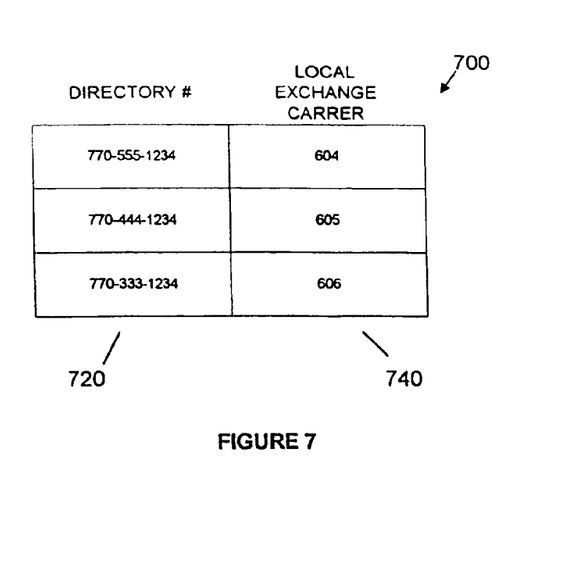
FIG. 7 is an illustration of an exemplary Calling Party Number-to-Carrier table in Line/Carrier database.

FIG. 7 is an illustration of an exemplary Calling Party Number-to-Carrier table 700 in Line/Carrier database 675. As shown, Joe's number is listed among the various calling party numbers in the Calling Party Number column 720. The Local Exchange Column 720 Carrier lists "604," the identifier for CLEC 1, as Joe's carrier.

Figure 8:
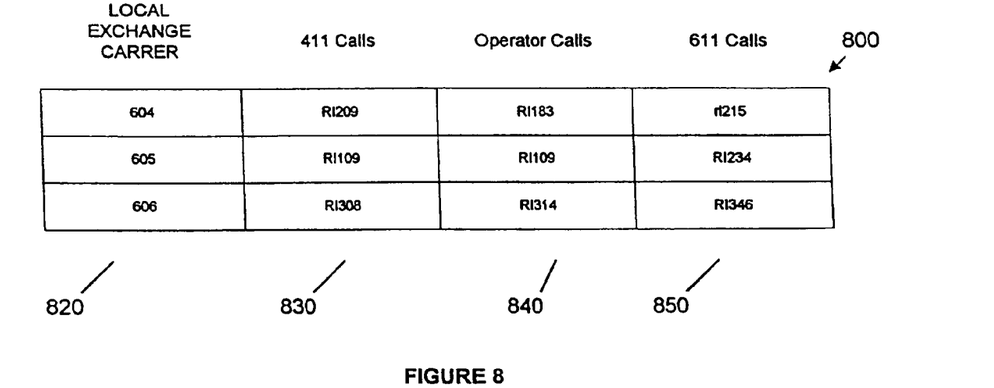
FIG. 8 is an illustration of an exemplary Carrier Routing Table.

Once CLEC 1 is identified as the carrier for Joe, the SCP searches the Carrier Routing Table in the database 675. The SCP 670 uses the carrier identifier obtained from the Calling Party Number-to-Carrier table 700 to obtain the routing instructions. FIG. 8 is an illustration of an exemplary Carrier Routing Table 800. As illustrated, the carrier, CLEC 1, has routing instructions for operated-assisted, 411, and 611 calls. The SCP 670 finds the service provider identifier in the table 800. Next, the SCP 670 obtains the routing instructions for 411 calls for subscribers of that carrier. As show, the carrier has specified that 411 calls be routed to routing index number RI209—the routing index number for the service center 640. Accordingly, the SCP 670 transmits the routing index number back to the SSP 610.

The SSP 610 routes the call to the routing index specified by the SCP 670. The call is then connected to the carrier's service center 640.

Certain service providers may want the WLEC to continue providing operator services for "0" calls. In these cases, the service provider will want the ILEC to provide "branding" services, whereby the ILEC plays a recording identifying the service provider prior to handling the call and upon concluding the call. Branding may be accomplished by implementing a method for screening the originating line number in the operator services switches. Calls are routed to the ILEC's operator services switch. The switch will send a query to determine the service provider. Once the local service provider is identified, the operator services switch will play the correct branding announcement, process the call, and then play a final branding announcement before releasing the call.

Figure 9:
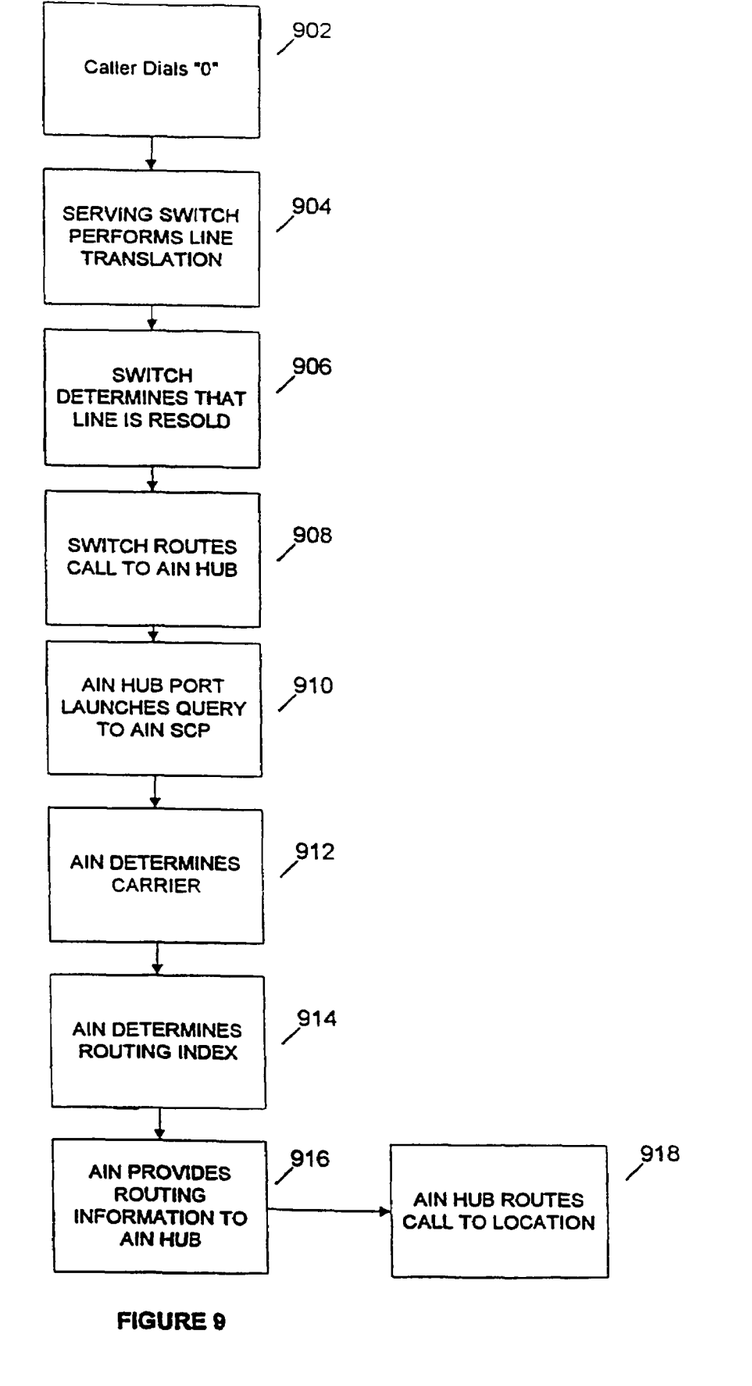
FIG. 9 is a flow chart illustrating the steps performed using the method and system of this invention.

FIG. 9 is a flow chart illustrating the flow of information during a call from a caller on a non-AIN resold line to a local operator (a "0" call). In step 902, the caller dials "0". In step 904, the serving switch in the non-AIN end office accesses a line class code to correlate the line class code of the caller's calling line to the appropriate routing identifier. Accordingly, in step 906, the serving switch determines that the line class code table identifies this line as a resold line and for "0" calls, the call should be routed to the AIN hub.

In step 908, the call is routed to the AIN hub via a trunk group terminating at a port in the AIN hub. The trunk group, however, has been assigned an AIN off-hook delayed trigger. Thus, in step 910, the AIN hub will suspend the call, collect all of the digits in the call and immediately launch a query to the AIN SCP. The query will include the calling number of the caller and the originally dialed number ("0"). The AIN SCP launches a service package to determine where this call should be routed. First, in step 912, the AIN SCP determines the local exchange carrier for the caller based upon the calling number. More particularly, the AIN SCP accesses the Calling Party Number-to-Carrier Table in the Line/Carrier database. The AIN SCP obtains a local exchange carrier code. The AIN SCP then accesses the Carrier Routing table. The AIN SCP obtains the appropriate routing information for the specified exchange carrier code and dialed number in step 914. In step 916, the AIN SCP provides the routing information, the calling number, and the carrier code back to the AIN hub. In step 918, the AIN hub routes the call to the location specified by the AIN SCP using the provided routing instructions.

Having thus described a method and system for routing service calls made from resold lines, it should be apparent to those skilled in the art that certain advantages have been achieved. It should also be appreciated that various modifications, adaptations, and alternative embodiments thereof, including the use of multiple AIN hubs and additional SCPs and SCP databases, for example, may be made within the scope and spirit of the present invention. The invention is further defined by the following claims:

What is claimed is:

1. A system for routing a call made from a calling line resold to a carrier, the system comprising:
   a switch coupled to the resold line, the switch being operative to determine at the switch whether the call is from the resold line and to route the call to a hub without any query to a service control point based on determining the call is from the resold line;
   the hub having a trigger provisioned thereon to cause the hub to launch a query to the service control point upon receiving the call from the switch wherein the trigger is assigned to the hub on a per-trunk basis so that the hub suspends all calls from a trunk group to the hub prior to launching the query to the service control point the trunk group including the resold line; and
   the service control point operative to receive the query from the hub and to provide routing instructions to the hub based upon resold line routing information stored in the service control point, the routing information identifying a location specified by the carrier for handling the call, wherein the routing information comprises a single set of line class codes assigned to all resold lines, wherein the line class codes reference a trunk group to the hub,
   wherein the hub is operative to utilize tabular information in the service control point to make routing decisions based on an area in which a caller making the call from the resold line is located.

2. The system for routing a call, as recited in claim 1, wherein the switch comprises a service switching point.

3. The system for routing a call, as recited in claim 1, wherein the switch includes a line class code database stored in the switch, the line class code database storing a line class code corresponding to a class of service of the resold line and information specifying that calls be routed to the hub.

4. The system for routing a call, as recited in claim 3, wherein the switch accesses the line class code database to route the call to the hub.

5. The system for routing a call, as recited in claim 1, wherein the query comprises a directory number of the calling line and a called party number.

6. The system for routing a call, as recited in claim 1, wherein the trigger comprises an off-hook delayed trigger.

7. The system for routing a call, as recited in claim 1, wherein the resold line routing information stored in the at least one database further comprises:
   an identifier for the directory number of the resold calling line; and
   an identifier for the carrier.

8. The system for routing a call, as recited in claim 1, wherein the resold line routing information comprises routing information specifying the location for handling the call.

9. In an intelligent network, a system for routing a call made from a calling line resold to a carrier, the system comprising:
   a first network element operative, without querying any service control points, to determine at the first network element whether the call is from the calling line resold to the carrier and to route the call to a second network element based on determining the call is from the calling line resold to the carrier, the second network element operative to launch a query;
   the second network element operative to launch a query to a third network element upon receiving the call from the first network element wherein the second network element is provisioned with a trigger to cause the second network element to launch the query wherein the trigger is assigned to an AIN hub on a per-trunk basis so that the hub suspends all calls from a trunk group to the hub prior to launching the query to the third network element the trunk group including the resold line; and
   the third network element operative to receive the query from the second network element and to provide routing instructions to the second network element based upon resold line routing information stored in a storage device coupled to the third network element, the routing information comprising a single set of line class codes assigned to all resold lines, wherein the line class codes reference the trunk group to the AIN hub;
   in response to receiving the routing instructions from the third network element, the second network element being further operative to route the call to the location for handling the call,
   wherein the second network element is further operative to utilize tabular information in the third network element to make routing decisions based on an area in which a caller making the call from the resold line is located.

10. The system for routing a call, as recited in claim 9, wherein the first network element comprises a switch.

11. The system for routing a call, as recited in claim 9, wherein the first network element comprises a switching point.

12. The system for routing a call, as recited in claim 9, wherein the second network element comprises a service switching point.

13. The system for routing a call, as recited in claim 9, wherein the third network element comprises a service control point.

14. The system for routing a call, as recited in claim 9, wherein the resold line routing information stored in the storage device further comprises:
   an identifier for the directory number of the calling line; and
   an identifier for the service provider.

15. The system for routing a call, as recited in claim 14, wherein the resold line routing information includes a routing index specifying the location for handling the call.

16. The system for routing a call, as recited in claim 9, wherein a line class code table is stored in the switch, the line class code table storing a line class code corresponding to a class of service of the line and information specifying that calls be routed to the service switching point.

17. A method for routing a call made from a calling line resold to a service provider, the method comprising:
routing the call to a switch wherein the switch is operative to determine at the switch without querying any service control points whether the call is made from the calling line resold to the service provider and whether to route the call to a service switching point, wherein routing the call comprises referencing a single set of line class codes assigned to all resold lines, wherein the line class codes reference a trunk group to an AIN hub;
routing the call from the switch to the service switching point in response to the switch determining, without querying any service control points, that the call is made from the calling line resold;
transmitting a query from the service switching point to a service control point to determine a location specified by the carrier for handling the call, the query including a directory number of the resold calling line and a called number;
encountering a trigger at the service switching point, thereby causing the service switching point to launch the query, wherein the trigger is assigned on a per-trunk basis so that all calls from a trunk group including the resold line are suspended prior to launching the query;
accessing a database containing an identifier for the service provider and an identifier for the location for handling the call;
transmitting the identifier for the location to the service switching point;
routing the call from the service switching point to the location for handling the call; and
utilizing tabular information in the service control point to make routing decisions based on an area in which a caller making the call from the resold line is located.

18. The method for routing a call, as recited in claim 17, wherein routing the call from the switch to the service switching point comprises:
accessing a table containing a line class code for the calling line and an identifier for the location of a trunk group coupled to the service switching point; and
routing the call to the trunk group based upon the identifier for the location of the trunk group.

* * * * *